Aug. 2, 1949.
O. LANGFELDER
2,477,755
SINGLE DRIVEN-SHAFT COMBINED BORING AND
RECIPROCABLE-SAW MACHINE
Filed April 28, 1948
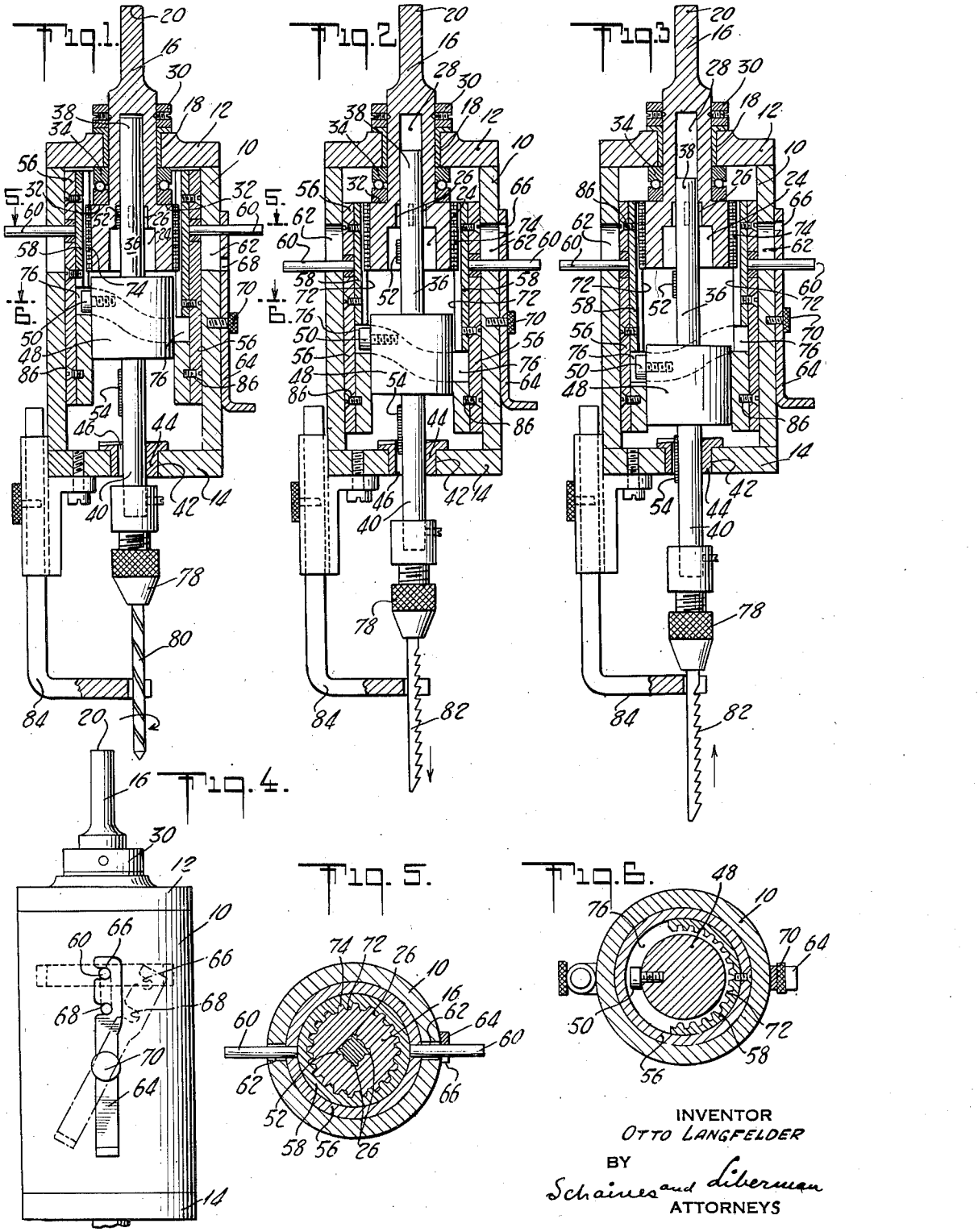
INVENTOR
OTTO LANGFELDER
BY
Schaines and Liberman
ATTORNEYS Patented Aug. 2, 1949

2,477,755

UNITED STATES PATENT OFFICE 2,477,755

SINGLE DRIVEN-SHAFT COMBINED BORING AND RECIPROCABLE-SAW MACHINE

Otto Langfelder, New York, N. Y.

Application April 28, 1948, Serial No. 23,824

12 Claims. (Cl. 74—57)

The present invention relates generally to a combined boring and recpirocatable saw blade apparatus. Specifically, it relates to a device which, driven by a single constantly rotating shaft, may be used either for hole boring purposes or for sawing purposes, it being appreciated that the ultimate operation is changed from one of rotation into a straight line reciprocation. One such apparatus is described and claimed in my Patent No. 2,417,170, granted March 11, 1947. The present invention relates to a different mechanism for achieving the same general operative results.

In the present apparatus, a pair of axially aligned shafts are provided, one of which is constantly rotated in one direction. The second shaft may be interfitted and rotated with the first shaft in one position of the former. Alternatively, the second shaft may be directly disengaged from the first shaft, but under control thereof caused to reciprocate in a straight line direction for sawing purposes.

The main object of the present invention, therefore, is the provision of a device of the character described which comprises a circular casing having a constantly rotating shaft extending thereinto, and a second shaft extending therefrom at the other end, a carriage within the casing rotatable with the first shaft, and rotating the second shaft in one position thereof, the carriage reciprocating the second shaft in another position thereof with respect to the first shaft.

Another object is the provision, in a device of the character described, of a carriage engaging the second shaft, the carriage being shiftable to engage the second shaft to the first for rotation therewith, and to disengage the second shaft from the first shaft to permit the former to reciprocate in a straight line during rotation of the first shaft.

Another object of my invention is the provision of a device of the character described comprising a casing having a constantly rotating shaft thereinto at one end, and a second shaft extending from the other end thereof, the first shaft being axially recessed to receive the second shaft therewithin, an axial slot in the first shaft and an axial rib on the second shaft, whereby on rotation of the first shaft, the second shaft is rotated thereby, a carriage within the casing, said carriage being shiftable to disengage the second shaft from the first, whereby rotative movement imparted to the carriage by the first shaft reciprocates the second shaft.

Associated objects of the invention reside in the provision of guide means on the casing for the second shaft during its reciprocatory movement; the vertically shiftable carriage within the casing; the ribs on the second shaft and the grooves to receive them. Other and further objects will in part be obvious and in part pointed out specifically in the following description of an illustrative embodiment.

Referring to the drawings annexed hereto and forming a part hereof,

Figure 1 is a vertical section, partly in elevation, of one form of device constructed according to and embodying my invention, showing the parts in position for drilling;

Fig. 2 is a similar view showing the parts in position for sawing;

Fig. 3 is a similar view showing the parts in another sawing position;

Fig. 4 is a side elevational view of the casing exterior illustrating the latching mechanism;

Fig. 5 is a horizontal section on the line 5—5 of Fig. 1; and

Fig. 6 is a horizontal section on the line 6—6 of Fig. 1.

Referring now to the drawings, the device of the present invention comprises a hollow cylindrical casing 10, closed at the top by a centrally apertured plate 12, and at the bottom by a centrally apertured plate 14. A circular shaft 16 projects into casing 10 from the top thereof through opening 18 in plate 12. The outer end 20 of the shaft 16 is adapted to be engaged to a suitable source of rotative power, as a motor (not shown). The inner end 22 of shaft 16, extending into the interior of casing 10 is axially and circularly recessed as at 24. Beyond and upwardly of recess 24, shaft 16 is vertically slotted or grooved as at 26, 26, the reasons for which will be developed below. Beyond and upwardly of recess 24 and slots 26, 26, shaft 16 is circularly cored as at 28 (see Figs. 2 and 3). A bushing 30 is secured about shaft 16 at the point where it is fitted into plate 12. Shaft 16 is shouldered outwardly, as at 32, about recess 24, and the space inside casing 10 between shoulder 32 and the underside is occupied by a ball bearing race 34.

Within casing 10, there is disposed a lengthwise extending circular shaft 36, the upper end 38 of which is of such cross-sectional area as to slidably fit within boring or recess 28 in shaft 16. The lower end 40 of inner shaft 36 projects downwardly and out of casing 10 through central aperture 42 in bottom plate 14. A bushing 44 is fixed on plate 14 within aperture 42, bushing 44 having a circular opening to permit sliding passage of shaft 40 therethrough, and having a vertically extending groove 46 in on the inner aspect thereof (see Figs. 1, 2 and 3), the reasons for which will be developed below.

Midway of the length of inner shaft 36 there is mounted a circular collar 48. Collar 48 may be formed as a separate member and secured on shaft 36, or it may be formed integrally therewith, as desired. A headed bolt 50 is threaded into collar 48, near the upper edge thereof, for reasons to be developed below.

A vertically extending and outwardly projecting rib 52 is provided on the upper portion of shaft 36, the length and width of rib 52 being substantially equal to the length and depth of slots 26, 26 in shaft 16. A vertically extending rib 54 is provided on the lower portion of shaft 36, the length of rib 54 being longer than bushing 44 and the width thereof being such as to permit passage through slot 46 in bushing 44.

A vertically slidable carriage assembly is disposed inside casing 10, this carriage comprising a cylindrical outer hollow shell 56, within which is secured a concentric cylindrical hollow inner shell 58. A pair of diametrically disposed pins 60, 60 are fixed to a collar fitted about shell 56, within a groove therewithin, and the pins 60, 60 extend outwardly of the casing through vertically extending slots 62, 62 in the casing. A pivoted lever 64 is provided on casing 10, having two teeth 66, 68 therein into either of which pin 60 may be received and held, lever 64 being pivotable about its securement to the casing by screw 70, and locked thereby.

The inner aspect of shell 58, at the upper portion thereof is vertically toothed or ribbed as at 72, to mesh with and engage vertically extending teeth or ribs 74 on the outer aspect of shaft 16 at its lower end. The lower portion of shell 58 is provided with an annular groove or trackway 76 opening inwardly of the casing, into which track a headed bolt 50 on collar 48 of the shaft 36 is received. Track 76 follows an undulating path; that is, it extends upwardly from one side of shell 58 down to the other side, and back upwardly, on a curve, for purposes to be detailed below.

A suitable chuck, as 78, is mounted on the lower end of shaft 36, depending from casing 10, into which may be fitted either a hole boring tool as 80 in Fig. 1 or a sawing blade, as 82, in Figs. 2 and 3. A guide assembly as 84 may be fitted on casing 10, to guide or line up the operating members 80, 82, as will be readily understood.

The operation of my device for hole boring purposes will now be described. Shaft 36 is rotated to align rib 52 with one of the grooves 26, so that shaft 36 may be shifted upwardly and rib 52 slid into the groove. Lever 64 is swung about its pivot to free pin arms 60, 60 so that they may be shifted upwardly, to the limit permitted by slots 62, 62, raising the carriage assembly of shells 56, 56 to the position of Fig. 1. In this position, rib 54 is well out of groove 46 in bushing 44. Lever 64 is then permitted to swing back (an automatic spring return may be provided—not shown) and one of pins 60 engaged and held in upper tooth 66. Tightening of screw-bolt 70 will then lock the carriage assembly in its uppermost position of Fig. 1. Shaft 16 is always engaged with the carriage assembly by the interfit of teeth or ribs 72, 74 on shell 58 and the shaft end respectively (see Fig. 5). Thus, on rotation of shaft 16, the rib 52-interfitted shaft 36, will be rotated along with the carriage assembly, rotating boring bit 80 along with it.

When it is desired to saw with my tool, bit 80 is replaced in chuck 78 by a saw blade as 82. Lever 64 is released and swung outwardly to the dotted line position of Fig. 4, permitting manual shifting of the carriage downwardly by movement of pins 60, 60 to the lower limit permitted by slots 62, 62, as in Fig. 2. Lever 64 is then returned to engage a pin 60 with the lower groove 68 and lever 64 locked by screw bolt 70. This lowering of the carriage draws shaft 36 downwardly and disengages rib 52 from groove 26. Shaft 36 is then rotated manually to align lower rib 54 with groove 46 in the lower bushing 44. The single groove 46 in bushing 44 is so located that the flat of blade 82 is in line therewith, it being understood that the line of sawing must be perfectly straight. It is to be noted that the leading edge of rib 54 fits well into groove 46 at this point, when the carriage is in its lowered position and the shaft collar 48 is in its upper position at the height of track or groove 76. At this point in the relative positioning of the parts, rotation of shaft 16 will—through the interengagement of teeth 72, 74—rotate the shells assembly. Shaft 36 cannot now rotate because rib 54 is captive within groove 46. However, rotation of shell 58 and rotation of track 76 will successively raise and lower headed bolt 50, collar 48 and shaft 36, causing a reciprocating axial movement of saw blade 82. Figure 2 illustrates the upper limit of the sawing or reciprocating stroke, while the lower limit thereof is seen in Fig. 3, rib 54 at this latter point extending out and below bushing 44.

It will be understood that variations may be made in the construction or arrangement of parts without departing from the spirit of my invention. For instance, my carriage is shown as formed of two shells 56, 58, secured together as by screws 86, 86. The carriage may be formed of a single shell, if desired, as will be readily appreciated.

Having now described my invention, what I claim and desire to secure by Letters Patent is:

1. A device of the character described comprising a casing, a constantly rotatable drive shaft extending thereinto from one end thereof, a driven shaft within the casing and extending therefrom at the opposite end thereof, a vertically shiftable carriage within the casing, an engagement between the drive shaft and carriage whereby rotation of the drive shaft rotates the carriage, the driven shaft being vertically shiftable within the casing, said driven shaft in the upper position thereof engaging the drive shaft and rotating therewith and with the carriage, and in the lower position thereof reciprocating vertically during rotation of the drive shaft and carriage.

2. A device of the character described comprising a casing, a constantly rotatable drive shaft extending thereinto from one end thereof, a driven shaft within the casing and extending therefrom at the opposite end thereof, a vertically shiftable carriage within the casing, a positive driving engagement between the drive shaft and carriage whereby rotation of the drive shaft rotates the carriage, the driven shaft being vertically shiftable within the casing simultaneously with the carriage, said driven shaft in the upper position thereof rotating with the carriage and the drive shaft, and in the lower position thereof reciprocating vertically during rotation of the drive shaft and carriage.

3. A device of the character described comprising a casing, a constantly rotatable drive shaft extending thereinto from one end thereof, a vertically shiftable carriage within the casing in constant driving engagement with the drive shaft, rotation of the drive shaft rotating the carriage, a driven shaft within the casing and extending therefrom at the other end thereof, said driven shaft being axially aligned with the drive shaft, an engagement between the driven shaft and the carriage the driven shaft and carriage being vertically and simultaneously shiftable within the casing, said driven shaft in the upper position thereof engaging and rotating with the carriage and the drive shaft, and in the lower position thereof being disengaged from the drive shaft and reciprocated vertically during rotation of the drive shaft and carriage.

4. A device of the character described comprising a hollow cylindrical casing, a rotatable driving shaft extending into the casing, a hollow cylindrical carriage within the casing, the driving shaft interfitting with the carriage, rotation of the driving shaft rotating the carriage, a driven shaft within the casing and extending outwardly therefrom, the driven shaft interfitting with the carriage and optionally engageable with the drive shaft for rotation therewith, the driven shaft being disengageable from the drive shaft for reciprocation in a straight line on rotation of the drive shaft and carriage.

5. A device as in claim 4, in which the end of the drive shaft within the casing is vertically toothed, and the inner aspect of the carriage is vertically toothed and in driving mesh with the toothed end of the drive shaft.

6. A device as in claim 4, in which the inner aspect of the carriage has an undulating annular track therearound, and the driven shaft has an extension therefrom receivable within the track, whereupon rotation of the carriage, on disengagement of the driven from the drive shaft, reciprocates the driven shaft in a straight line.

7. A device as in claim 4, in which the carriage is vertically shiftable within the casing, and means are provided to lock the carriage optionally in an upper and lower position, the carriage in its upper position engaging the driven with the drive shaft, and in its lower position disengaging the driven from the drive shaft.

8. A device of the character described comprising a casing, a constantly rotatable drive shaft extending thereinto from one end thereof, a driven shaft within the casing and extending therefrom at the opposite end thereof, a vertically shiftable carriage within the casing, a positive driving interfit between the drive shaft and the carriage whereby rotation of the drive shaft rotates the carriage, the driven shaft being vertically shiftable within the casing, said driven shaft in the upper position thereof engaging the drive shaft and rotating with the carriage and the drive shaft, and in the lower position thereof being disengaged from the drive shaft and reciprocating vertically during rotation of the drive shaft and carriage, and guide means on said opposite end of the casing channelling the driven shaft in a single plane during its reciprocatory motion.

9. A device as in claim 8, in which the channelling means comprise a centrally and longitudinally apertured bushing having a lengthwise inwardly directed groove therein.

10. A device as in claim 8, in which the channelling means comprise a centrally apertured bushing having a lengthwise inwardly directed groove therein, and the driven shaft has an outwardly extending rib receivable within the groove.

11. A device of the character described comprising a casing, a constantly rotatable drive shaft extending thereinto from one end thereof, a vertically shiftable carriage within the casing in constant engagement with the drive shaft, rotation of the drive shaft rotating the carriage, a driven shaft within the casing and extending therefrom at the other end thereof, said driven shaft engaging the carriage, said driven shaft being axially aligned with the drive shaft, a groove in the drive shaft and a first rib on the upper part of the driven shaft, the driven shaft and carriage being vertically and simultaneously shiftable within the casing, the rib on said driven shaft in the upper position thereof engaging the groove in the drive shaft and rotating with the carriage and the drive shaft, and in the lower position thereof being disengaged from the drive shaft and reciprocated vertically during rotation of the drive shaft and carriage, a second rib on the lower part of the driven shaft and a grooved bushing at said other end of the casing through which the driven shaft projects, the second rib fitting into the groove in the lower portion of the carriage to prevent rotation of the driven shaft and limit its reciprocatory movement to a straight line direction.

12. A single driven-shaft combined boring and reciprocable-saw machine of the character described comprising a constantly rotatable drive shaft, a driven shaft in axial alignment with the drive shaft, the two shafts being interfitted so that rotation of the drive shaft rotates the driven shaft simultaneously therewith, carriage means in constant engagement with the drive shaft associated with the driven shaft to disengage same optionally from the drive shaft, said means being operable on disengagement of the two shafts to reciprocate the driven shaft in a straight line direction during rotative movement of the drive shaft.

OTTO LANGFELDER.

REFERENCES CITED

The following references are of record in the file of this patent:

UNITED STATES PATENTS

| Number | Name | Date |
| --- | --- | --- |
| 302,430 | Roque | July 22, 1884 |
| 461,754 | Hay | Oct. 20, 1891 |
| 462,530 | Booth | Nov. 3, 1891 |
| 637,338 | James | Nov. 21, 1899 |
| 847,591 | Miller | Mar. 19, 1907 |
| 2,121,831 | Simmons | June 28, 1938 |